US012798471B2

(12) United States Patent
Hachisuka et al.

(10) Patent No.: US 12,798,471 B2
(45) Date of Patent: Nov. 17, 2026

(54) HEADLIGHT CONTROL DEVICE, HEADLIGHT CONTROL METHOD, AND STORAGE MEDIUM

(71) Applicants: TOYOTA JIDOSHA KABUSHIKI KAISHA, Toyota (JP); DENSO CORPORATION, Kariya-city (JP)

(72) Inventors: Motoaki Hachisuka, Toyota (JP); Tetsuya Ikuta, Miyoshi (JP); Takuya Nomura, Chita-gun (JP); Kazuki Kawamura, Toyota (JP)

(73) Assignees: TOYOTA JIDOSHA KABUSHIKI KAISHA, Toyota (JP); DENSO CORPORATION, Kariya-city (JP)

( * ) Notice: Subject to any disclaimer, the term of this patent is extended or adjusted under 35 U.S.C. 154(b) by 52 days.

(21) Appl. No.: 18/818,057

(22) Filed: Aug. 28, 2024

(65) Prior Publication Data

US 2025/0128658 A1 Apr. 24, 2025

(30) Foreign Application Priority Data

Oct. 23, 2023 (JP) ................................ 2023-181654

(51) Int. Cl.
*B60Q 1/14* (2006.01)
*H05B 47/115* (2020.01)

(52) U.S. Cl.
CPC ......... *B60Q 1/1423* (2013.01); *H05B 47/115* (2020.01); *B60Q 2300/45* (2013.01)

(58) Field of Classification Search
CPC .... H05B 47/115; H05B 47/125; B60Q 1/085; B60Q 1/143; B60Q 1/1423; B60Q 2300/45; B60Q 2300/054
See application file for complete search history.

(56) References Cited

U.S. PATENT DOCUMENTS

| | | | | |
|---|---|---|---|---|
| 10,189,396 | B2 * | 1/2019 | Asaoka | F21S 41/30 |
| 10,640,035 | B2 * | 5/2020 | Morimura | G08G 1/166 |
| 10,759,329 | B2 | 9/2020 | Morimura et al. | |
| 10,946,791 | B2 | 3/2021 | Morimura et al. | |
| 11,260,789 | B2 | 3/2022 | Morimura et al. | |
| 12,145,500 | B2 * | 11/2024 | Yamasaki | B60Q 1/04 |
| 2013/0343071 | A1 * | 12/2013 | Nagaoka | B60Q 1/085 362/466 |

(Continued)

FOREIGN PATENT DOCUMENTS

JP 2013-184614 A 9/2013

*Primary Examiner* — Tung X Le
(74) *Attorney, Agent, or Firm* — Sughrue Mion, PLLC

(57) ABSTRACT

A headlight control device including a headlight that emits light toward an area in front of a host vehicle, an external sensor that detects an external environment of the host vehicle, a pedestrian recognizer that recognizes a pedestrian area including a pedestrian located in front of the host vehicle based on a detection result of the external sensor, a headlight controller that reduces the brightness of light with which a dimming area including an upper end of the pedestrian area in the pedestrian area is irradiated, and a change determination unit that determines, based on a detection result of the external sensor, whether the height of the pedestrian area has changed, wherein the headlight controller changes the occupancy ratio of the dimming area to the pedestrian area when the height of the pedestrian area has changed.

6 Claims, 6 Drawing Sheets

(56) References Cited

U.S. PATENT DOCUMENTS

| | | | | |
|---|---|---|---|---|
| 2015/0142263 | A1* | 5/2015 | Hirai | H04N 23/55<br>348/148 |
| 2015/0178577 | A1* | 6/2015 | Baba | G06V 20/58<br>382/103 |
| 2017/0337821 | A1* | 11/2017 | Masuda | B60Q 1/26 |
| 2020/0150702 | A1 | 5/2020 | Ueda | |
| 2023/0056501 | A1* | 2/2023 | Yu | G06V 20/58 |
| 2023/0382289 | A1* | 11/2023 | Watano | H04N 23/61 |

* cited by examiner

HEADLIGHT CONTROL DEVICE, HEADLIGHT CONTROL METHOD, AND STORAGE MEDIUM

CROSS-REFERENCE TO RELATED APPLICATION

This application claims priority to Japanese Patent Application No. 2023-181654 filed on Oct. 23, 2023, incorporated herein by reference in its entirety.

BACKGROUND

1. Technical Field

The present disclosure relates to a headlight control device, a headlight control method, and a storage medium.

2. Description of Related Art

Japanese Unexamined Patent Application Publication No. 2013-184614 (JP 2013-184614 A) has been conventionally known as a technical literature regarding headlights. JP 2013-184614 A discloses a technique for reducing the amount of illumination to be applied to a dimming area including approximately an upper body of a pedestrian, thereby reducing the glare felt by pedestrian.

SUMMARY

When the detection accuracy of a pedestrian's upper body is insufficient, it may be difficult to set a dimming area. Therefore, it may be considered that a predetermined proportion of the height of a pedestrian is set as the dimming area, for example. However, for example, when a predetermined proportion of the height of the pedestrian is set as the dimming area even in a case where a part of the pedestrian is obstructed by a shielding object or the like, there may be a risk that the setting of the dimming area is inappropriate.

The present disclosure has an object to provide a headlight control device, a headlight control method, and a storage medium that can appropriately set a dimming area.

A headlight control device according to the present disclosure includes: a headlight that emits light toward an area in front of a host vehicle, an external sensor that detects an external environment of the host vehicle, a pedestrian recognizer that recognizes a pedestrian area including a pedestrian located in front of the host vehicle based on a detection result of the external sensor, a headlight controller that reduces the brightness of the light with which a dimming area including an upper end of the pedestrian area in the pedestrian area is irradiated, and a change determination unit that determines, based on a detection result of the external sensor, whether the height of the pedestrian area has changed, wherein the headlight controller changes the occupancy ratio of the dimming area to the pedestrian area when the height of the pedestrian area has changed.

A headlight control method according to the present disclosure is a headlight control method for a headlight control device that controls a headlight for emitting light toward an area in front of a host vehicle, the method including emitting the light by the headlight, recognizing a pedestrian area including a pedestrian located in front of the host vehicle based on a detection result of an external sensor of the host vehicle, reducing brightness of the light with which a dimming area including an upper end of the pedestrian area in the pedestrian area is irradiated, determining, based on the detection result of the external sensor, whether a height of the pedestrian area has changed, and changing the occupancy ratio of the dimming area to the pedestrian area when the height of the pedestrian area has changed.

A storage medium of the present disclosure is a storage medium storing a headlight control program for operating an ECU of a headlight that emits light toward an area in front of a host vehicle, the program causing the ECU to operate as a pedestrian recognizer that recognizes a pedestrian area including a pedestrian located in front of the host vehicle based on a detection result of an external sensor of the host vehicle, a headlight controller that reduces brightness of the light with which a dimming area including an upper end of the pedestrian area in the pedestrian area is irradiated, and a change determination unit that determines, based on a detection result of the external sensor, whether a height of the pedestrian area has changed, wherein the headlight controller changes the occupancy ratio of the dimming area to the pedestrian area when the height of the pedestrian area has changed.

According to the present disclosure, it is possible to provide a headlight control device, a headlight control method, and a storage medium that can appropriately set a dimming region.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings.

Headlight Control Device

Figure 1:
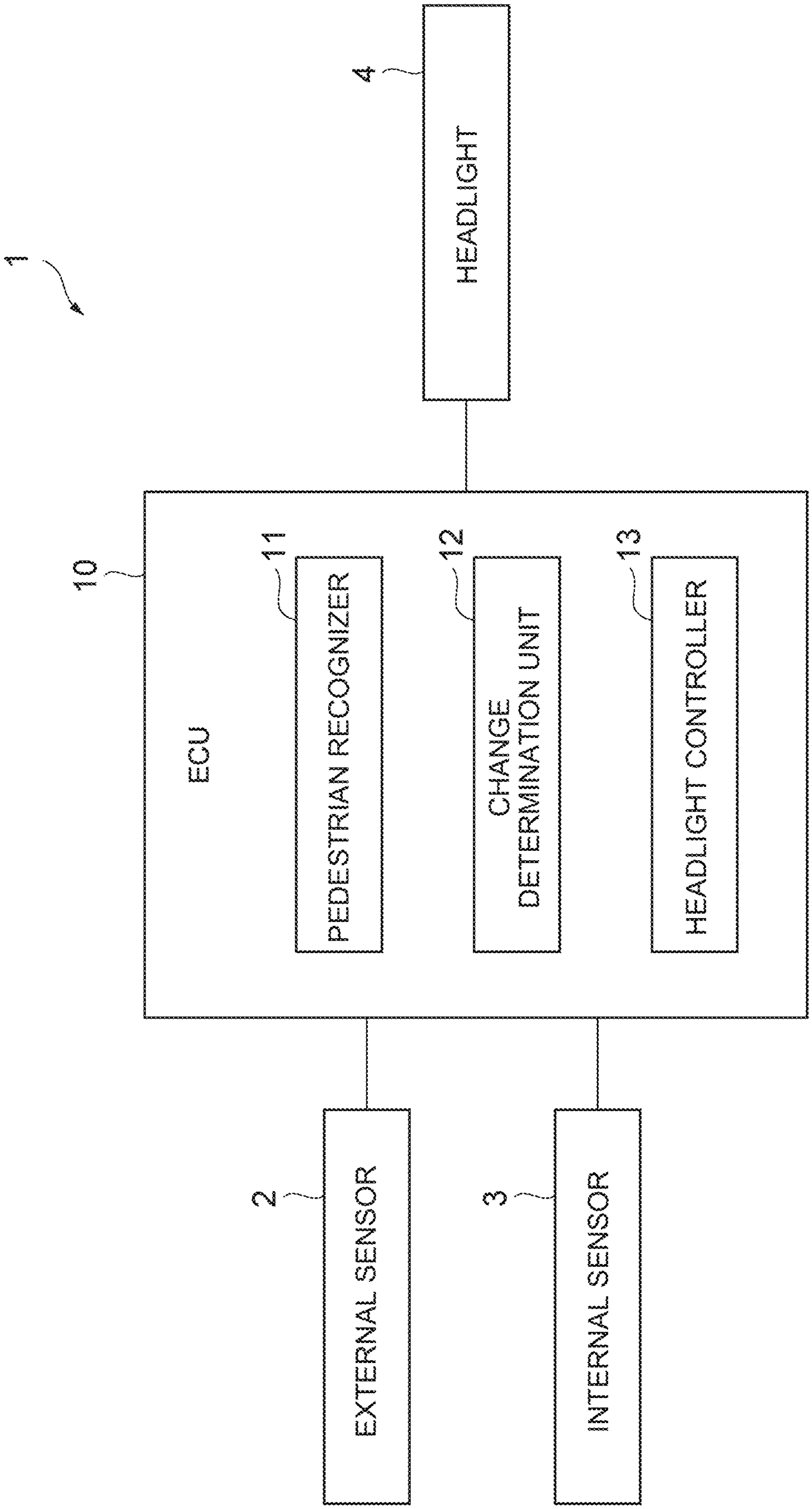
FIG. 1 is a block diagram of a functional configuration of a headlight control device according to an embodiment.

FIG. 1 is a block diagram of a functional configuration of a headlight control device according to an embodiment. The headlight control device 1 shown in FIG. 1 is used, for example, for an autonomous driving vehicle, a driving support vehicle or the like. As shown in FIG. 1, the headlight control device 1 includes an external sensor 2, an internal sensor 3, a headlight 4, and an electronic control unit [ECU] 10.

The external sensor 2 is a detection device for detecting an external environment of a host vehicle (a situation around the host vehicle). The external sensor 2 includes, for example, a camera and a radar sensor. The camera is an imaging device for imaging an external situation of the host vehicle. The camera is provided, for example, on the back side of the windshield of the host vehicle, and images an area in front of the host vehicle. The camera images pedestrians and the like located in front of the host vehicle. The camera transmits a captured image regarding the external situation of the host vehicle to the ECU 10. The radar sensor is a detection device for detecting objects around the host vehicle using radio waves (for example, millimeter waves) or light. The radar sensor is, for example, a millimeter wave radar, light detection and ranging [LiDAR] or the like. The radar sensor detects the distances to the pedestrians located in front of the host vehicle, relative positions thereof, etc. The radar sensor transmits information about the detected objects to the ECU 10.

The internal sensor 3 is a detection device for detecting the traveling state of the host vehicle. The internal sensor 3 includes, for example, a vehicle speed sensor, a yaw rate sensor, etc. The vehicle speed sensor is a detector for detecting the speed of the host vehicle. The vehicle speed sensor transmits vehicle speed information to the ECU 10. The yaw rate sensor is a detector for detecting the yaw rate (rotational angular velocity) around a vertical axis of the center of gravity of the host vehicle. The yaw rate sensor is, for example, a gyro sensor or the like. The yaw rate sensor transmits yaw rate information of the host vehicle to the ECU 10.

The headlight 4 is attached to a front portion of the host vehicle. The headlight 4 emits light toward the area in front of the host vehicle. The headlight 4 includes a plurality of light sources, a digital micromirror device [DMD], a lens, etc. The DMD reflects light emitted from the plurality of light sources. The lens focuses the light reflected by the DMD. The light focused by the lens is emitted toward the area in front of the host vehicle.

The light source is, for example, high-intensity discharge [HID], a halogen lamp, a light emitting diode [LED] or the like. The DMD has a plurality of micromirrors arranged in a matrix form. The direction of the optical axis of each micromirror is variable. Each micromirror is swingable in a vertical direction and a horizontal direction. The direction of the optical axis of each micromirror is controlled with a control signal transmitted from the ECU 10.

The ECU 10 is an electronic control unit including a central processing unit [CPU], and a storage unit such as a read only memory [ROM] or a random access memory [RAM]. The storage unit is an example of a storage medium. In the ECU 10, various functions are implemented, for example, by executing programs stored in the storage unit by the CPU. The ECU 10 is provided, for example, in the host vehicle.

The ECU 10 includes a pedestrian recognizer 11, a change determination unit 12, and a headlight controller 13 as functional components.

The pedestrian recognizer 11 recognizes pedestrians located in front of the host vehicle based on the detection result of the external sensor 2. The pedestrian recognizer 11 recognizes the pedestrians by pattern matching using image patterns of pedestrians prepared in advance.

Figure 2:
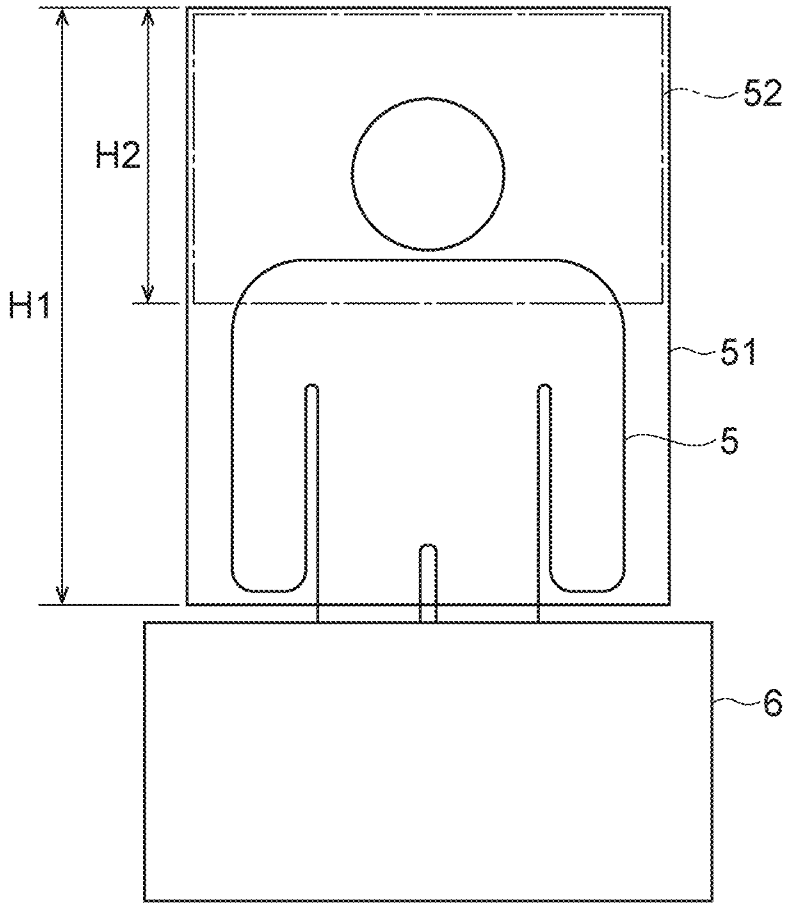
FIG. 2 is a schematic diagram showing an example of a pedestrian detection result.

FIG. 2 is a schematic diagram showing an example of a pedestrian detection result. As shown in FIG. 2, when a pedestrian 5 is detected by the external sensor 2, the pedestrian recognizer 11 recognizes a pedestrian area 51 including the pedestrian 5 as a pedestrian 5. The pedestrian area 51 is an area surrounding the pedestrian 5. The pedestrian area 51 has, for example, a rectangular shape. There is a case where a part (for example, a lower body) of the pedestrian 5 is blocked by a shielding object 6. The pedestrian recognizer 11 recognizes, as a pedestrian 5, only a portion of the pedestrian 5 which is exposed from the shielding object 6.

Figure 3:
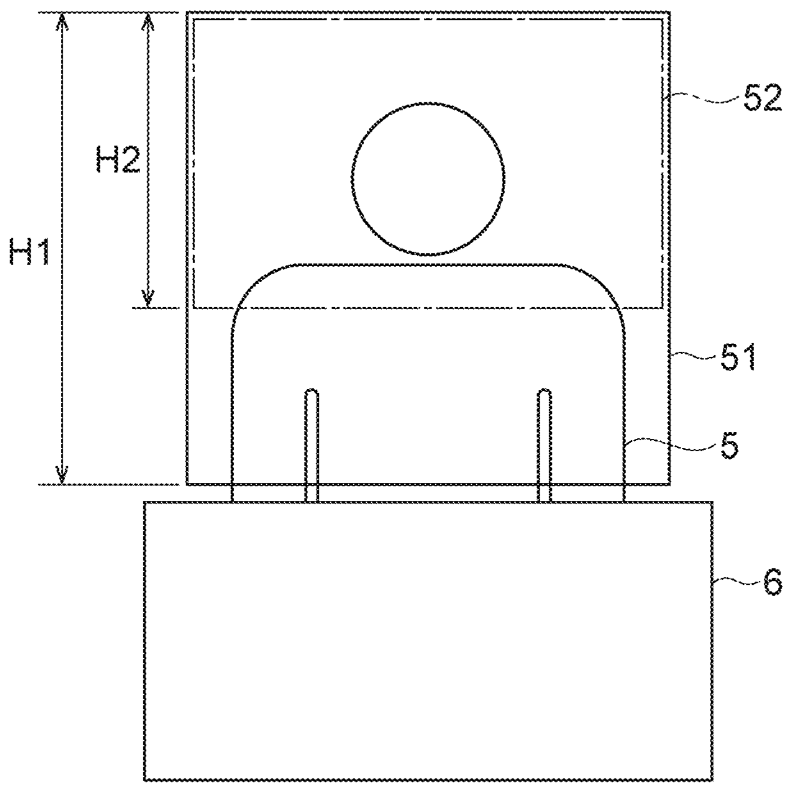
FIG. 3 is a schematic diagram showing an example of a pedestrian detection result.

FIG. 3 is a schematic diagram showing an example of a pedestrian detection result. Since a part of the pedestrian 5 shown in FIG. 3 that is blocked by the shielding object 6 is larger than a part of the pedestrian 5 shown in FIG. 2 that is blocked by the shielding object 6. Therefore, the height H1 of a pedestrian area 51 shown in FIG. 3 (second pedestrian area) is smaller than the height H1 of the pedestrian area 51 shown in FIG. 2 (first pedestrian area). As described above, there is a case where the height H1 of the pedestrian area 51 decreases due to a change in the situation of the shielding object 6 or the like. Note that the height H1 of the pedestrian area 51 is, for example, the length of the pedestrian area 51 in the vertical direction.

Figure 4:
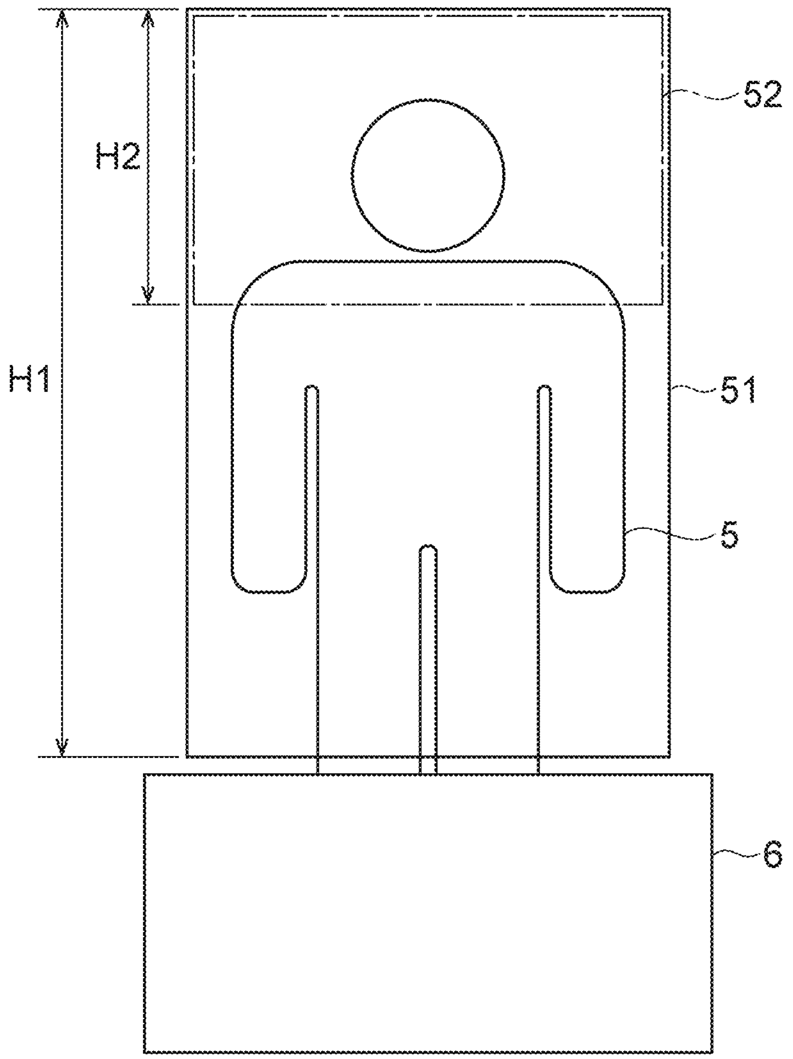
FIG. 4 is a schematic diagram showing an example of a pedestrian detection result.

FIG. 4 is a schematic diagram showing an example of a pedestrian detection result. Since a part of the pedestrian 5 shown in FIG. 4 that is blocked by the shielding object 6 is smaller than the part of the pedestrian 5 shown in FIG. 2 that is blocked by the shielding object 6, the height H1 of a pedestrian area 51 shown in FIG. 4 (third pedestrian area) is larger than the height H1 of the pedestrian area 51 shown in FIG. 2 (first pedestrian area). As described above, there is a case where the height H1 of the pedestrian area 51 increases due to a change in the situation of the shielding object 6 or the like.

In the present embodiment, the height H1 of the pedestrian area 51 is a value which is calculated based on the positional relation such as the distance between the host vehicle and the pedestrian 5. In other words, the height H1 of the pedestrian area 51 is a value corresponding to the actual height of the pedestrian 5 regardless of the positional relation between the host vehicle and the pedestrian 5. The height H1 of the pedestrian area 51 does not substantially change according to the change of the positional relation between the host vehicle and the pedestrian 5.

The change determination unit 12 determines, based on the detection result of the external sensor 2, whether the height H1 of the pedestrian area 51 has changed. The change determination unit 12 determines whether there is a difference between the height H1 of the pedestrian area 51 at a first time and the height H1 of the pedestrian area 51 at a second time. The change determination unit 12 determines whether the height H1 of the pedestrian area 51 has decreased or whether the height H1 of the pedestrian area 51 has increased. The change determination unit 12 determines whether the height H1 of the pedestrian area 51 at the second time is smaller than the height H1 of the pedestrian area 51 at the first time, or whether the height H1 of the pedestrian area 51 at the second time is larger than the height H1 of the pedestrian area 51 at the first time.

The headlight controller 13 sets a dimming area 52 within the pedestrian area 51. The dimming area 52 is an area including an upper end of the pedestrian area 51 in the pedestrian area 51. In other words, the dimming area 52 is an area which extends from the upper end of the pedestrian area 51 to a position between the upper end and lower end of the pedestrian area 51 in the pedestrian area 51. The dimming area 52 is an area whose height from the upper end of the pedestrian area 51 has a preset ratio to the height H1 of the pedestrian area 51 in the pedestrian area 51. The dimming area 52 has, for example, a rectangular shape. The headlight controller 13 sets the occupancy ratio of the dimming area 52 to the pedestrian area 51 (in the present embodiment, a value obtained by dividing the height H2 of the dimming area 52 by the height H1 of the pedestrian area 51). Note that the height H2 of the dimming area 52 is, for example, the length of the dimming area 52 in the vertical direction.

The headlight controller 13 controls the operation of the headlight 4. The headlight controller 13 executes dimming control to reduce the brightness of light with which the dimming area 52 is irradiated. The headlight controller 13 changes the optical axes of the micromirrors corresponding to the dimming area 52 among the plurality of micromirrors of the headlight 4. As a result, the light reflected by the micromirrors is emitted toward an area different from the dimming area 52. Therefore, the illuminance of the dimming area 52 decreases.

When the height H1 of the pedestrian area 51 changes, the headlight controller 13 changes the occupancy ratio of the dimming area 52 to the pedestrian area 51 (hereinafter referred to as "ratio (H2/H1)"). The headlight controller 13 increases the ratio (H2/H1) when the height H1 of the pedestrian area 51 decreases. For example, when the height H1 of the pedestrian area 51 at the second time (for example, see FIG. 3) is smaller than the height H1 of the pedestrian area 51 at the first time (for example, see FIG. 2), the headlight controller 13 makes the ratio (H2/H1) at the second time larger than the ratio (H2/H1) at the first time.

The headlight controller 13 decreases the ratio (H2/H1) when the height H1 of the pedestrian area 51 increases. For example, when the height H1 of the pedestrian area 51 at the second time (for example, see FIG. 4) is larger than the height H1 of the pedestrian area 51 at the first time (for example, see FIG. 2), the headlight controller 13 makes the ratio (H2/H1) of the second time smaller than the ratio (H2/H1) at the first time.

Figure 5:
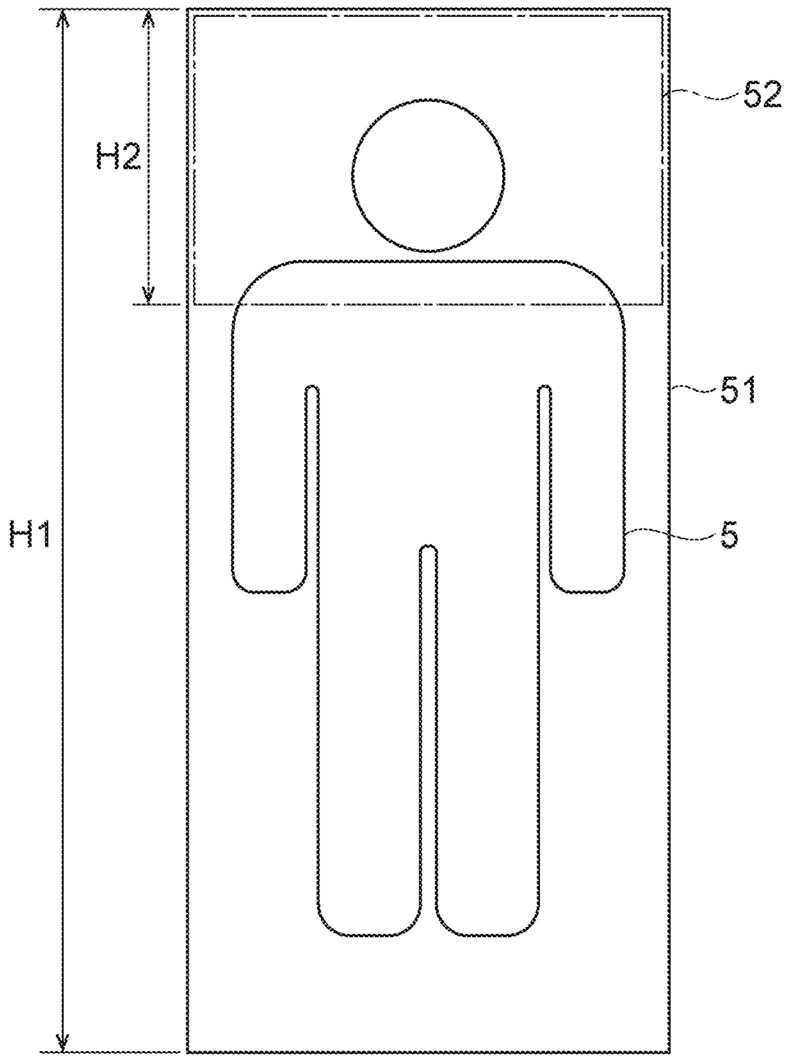
FIG. 5 is a schematic diagram showing an example of a pedestrian detection result.

The headlight controller 13 reduces the ratio (H2/H1) with a predetermined threshold value set as a lower limit of the ratio (H2/H1). In other words, even when the height H1 of the pedestrian area 51 increases, the headlight controller 13 does not reduce the ratio (H2/H1) to a value smaller than the predetermined threshold value. The predetermined threshold value is, for example, 25%. FIG. 5 is a schematic diagram showing an example of a pedestrian detection result. As shown in FIG. 5, there is a case where the pedestrian 5 is not blocked by a shielding object 6 (see FIG. 2, etc.) (when the entire body of the pedestrian 5 is recognized). In such a case, when the ratio (H2/H1) is excessively reduced, the head portion of the pedestrian 5 may not be located inside the dimming area 52. Therefore, the headlight controller 13 does not reduce the ratio (H2/H1) to a value smaller than the predetermined threshold value as described above.

The headlight controller 13 does not change the ratio (H2/H1) when the height H1 of the pedestrian area 51 has not changed. In other words, the headlight controller 13 maintains the ratio (H2/H1) when the height H1 of the pedestrian area 51 is maintained.

Figure 6:
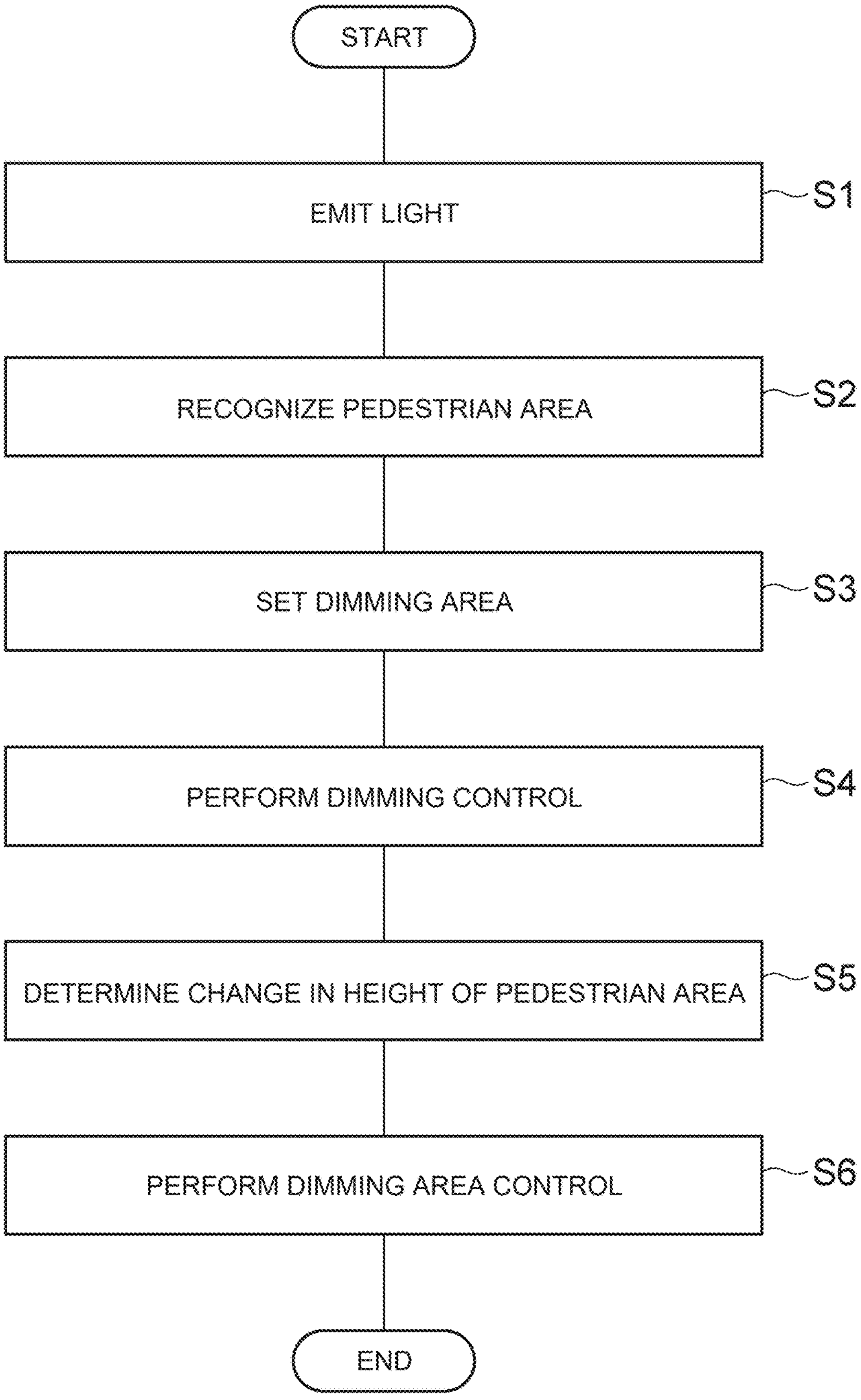
FIG. 6 is a flowchart showing each step of a headlight control method using the headlight control device shown in FIG. 1.

Processing of ECU of Headlight Control Device, Headlight Control Method and Headlight Control Program Next, an example of processing by the ECU 10 of the headlight control device 1 will be described. FIG. 6 is a flowchart showing each step of the processing by the ECU 10 (a headlight control method using the headlight control device 1). As shown in FIG. 6, the ECU 10 irradiates the area in front of the host vehicle with light using the headlight 4 in step S1 (emission step). For example, when the brightness outside the host vehicle becomes smaller than a predetermined threshold, the ECU 10 activates the headlights 4. In step S2 (recognition step), the ECU 10 recognizes the pedestrian area 51 including the pedestrian 5 located in front of the host vehicle based on the detection result of the external sensor 2.

The ECU 10 sets a dimming area 52 within the pedestrian area 51 in step S3 (dimming area setting step). In step S4 (dimming step), the ECU 10 reduces the brightness of light with which the dimming area 52 of the pedestrian area 51 is irradiated. In step S5 (determination step), the ECU 10 determines based on the detection result of the external sensor 2 whether the height H1 of the pedestrian area 51 has changed. When the height H1 of the pedestrian area 51 has changed, the ECU 10 changes the occupation ratio (H2/H1) of the dimming area 52 in the pedestrian area 51 in step S6 (dimming area adjustment step). The ECU 10 increases the ratio (H2/H1) when the height of the pedestrian area 51 decreases. The ECU 10 decreases the ratio (H2/H1) when the height of the pedestrian area 51 increases.

A headlight control program causes the ECU 10 to function (operate) as a pedestrian recognizer 11, a change determination unit 12, and a headlight controller 13. The headlight control program is provided, for example, by a non-transitory recording medium such as a ROM or a semiconductor memory. The headlight control program may be provided via communication such as a network.

As described above, in the headlight control device 1 of the present embodiment, the headlight controller 13 changes the ratio (H2/H1) at which the dimming area 52 occupies in the pedestrian area 51 when the height H1 of the pedestrian area 51 changes. As a result, even when a part of the pedestrian 5 is blocked by the shielding object 6 or the like, for example, in a case where recognition of an area including the upper body of the pedestrian 5 is insufficient due to the performance of the external sensor 2, it is possible to appropriately set the dimming area 52 including the head portion of the pedestrian 5. Therefore, according to the headlight control device 1, the dimming area 52 can be appropriately set.

The ECU 10 increases the ratio (H2/H1) when the height H1 of the pedestrian area 51 decreases. When the height H1 of the pedestrian area 51 decreases, there is a possibility that a part of the pedestrian 5 is blocked by the shielding object 6, or the range of the shielding object 6 increases, and in that case, the occupancy ratio of the head portion of the pedestrian 5 to the pedestrians 5 tends to increase. Therefore, when the height H1 of the pedestrian area 51 decreases, it is possible to appropriately set the area including the head portion of the pedestrian 5 as the dimming area 52 by increasing the ratio (H2/H1).

The ECU 10 decreases the ratio (H2/H1) when the height H1 of the pedestrian area 51 increases. When the height H1 of the pedestrian area 51 increases, there is a possibility that the range of the shielding object 6 blocking the pedestrian 5 has decreased, or the shielding object 6 has disappeared. In this case, the occupancy ratio of the head portion of the pedestrian 5 to the pedestrian 5 tends to decrease. Therefore, when the height H1 of the pedestrian area 51 increases, it is possible to appropriately set the area including the head portion of the pedestrian 5 as the dimming area 52 by decreasing the ratio (H2/H1).

The ECU 10 decreases the ratio (H2/H1) with a predetermined threshold value set as a lower limit of the ratio (H2/H1). As a result, for example, when the entire body of the pedestrian 5 is recognized, the dimming area 52 is restricted from excessively decreasing.

According to the headlight control method and headlight control program of the present embodiment, similarly to the headlight control device 1, it is possible to appropriately set the dimming area 52.

Although the embodiment of the present disclosure has been described above, the present disclosure is not limited to the above embodiment.

Although the direction of the optical axis of each micromirror of the headlight 4 was variable, the direction of the optical axis of each micromirror of the headlight 4 may be fixed. In this case, the reflectance of each micromirror of the headlight 4 may be variable. In other words, the brightness of light with which the dimming area 52 is irradiated may be controlled by adjusting the reflectance of the micromirrors of the headlight 4.

Although the external sensor 2 has a radar sensor, the external sensor 2 does not need to have a radar sensor.

The ECU 10 may execute the dimming control only when the vehicle speed detected by the internal sensor 3 is within a predetermined range. The ECU 10 does not need to perform dimming control, for example, when the vehicle speed detected by the internal sensor 3 is higher than a predetermined threshold value (for example, 100 km/h).

The headlight control device 1 does not need to include the internal sensor 3.

Even when the height H1 of the pedestrian area 51 decreases, the ECU 10 does not need to increase the ratio (H2/H1). Even when the height H1 of the pedestrian area 51 increases, the ECU 10 does not need to reduce the ratio (H2/H1). The ECU 10 may change the ratio (H2/H1) when the height H1 of the pedestrian area 51 changes.

What is claimed is:

1. A headlight control device comprising:

a headlight configured to emit light toward an area in front of a host vehicle;

an external sensor configured to detect an external environment of the host vehicle;

a memory storing one or more programs; and a processor, wherein the one or more programs, when executed by the processor, causes the processor to:

recognize a pedestrian area including a pedestrian located in the area in front of the host vehicle based on a detection result of the external sensor;

reduce a brightness of the light with which a dimming area including an upper end of the pedestrian area in the pedestrian area is irradiated, wherein the brightness of the light is reduced according to an occupancy ratio of the dimming area to the pedestrian area;

determine, based on the detection result of the external sensor, whether a height of the pedestrian area has changed, based on a determination that the height of the pedestrian area has changed, change the occupancy ratio based on the changed height of the pedestrian area.

2. The headlight control device according to claim 1, wherein the one or more programs, when executed by the processor, causes the processor to increase the occupancy ratio when the height of the pedestrian area decreases.

3. The headlight control device according to claim 1, wherein the one or more programs, when executed by the processor, causes the processor to increase the occupancy ratio when the height of the pedestrian area increases.

4. The headlight control device according to claim 3, wherein the one or more programs, when executed by the processor, causes the processor to reduce the occupancy ratio with a predetermined threshold value set as a lower limit value of the occupancy ratio.

5. A headlight control method for a headlight control device that controls a headlight for emitting light toward an area in front of a host vehicle, the method comprising:

emitting the light by the headlight;

recognizing a pedestrian area including a pedestrian located in front of the host vehicle based on a detection result of an external sensor of the host vehicle;

reducing a brightness of the light with which a dimming area including an upper end of the pedestrian area in the pedestrian area is irradiated, wherein the brightness of the light is reduced according to an occupancy ratio of the dimming area to the pedestrian area;

determining, based on the detection result of the external sensor, whether a height of the pedestrian area has changed; and based on a determination that the height of the pedestrian area has changed, changing the occupancy ratio based on the changed height of the pedestrian area.

6. A non-transitory storage medium storing a headlight control program that, when executed by an electronic control unit (ECU) of a headlight configured to emit light toward an area in front of a host vehicle, cause the ECU to:

recognize a pedestrian area including a pedestrian located in the area in front of the host vehicle based on a detection result of an external sensor of the host vehicle;

reduce a brightness of the light with which a dimming area including an upper end of the pedestrian area in the pedestrian area is irradiated, wherein the brightness of the light is reduced according to an occupancy ratio of the dimming area to the pedestrian area; and determine, based on the detection result of the external sensor, whether a height of the pedestrian area has changed, based on a determination that the height of the pedestrian area has changed, change the occupancy ratio based on the changed height of the pedestrian area.

* * * * *